(12) United States Patent
Gopalkrishna et al.

(10) Patent No.: US 7,388,056 B2
(45) Date of Patent: Jun. 17, 2008

(54) PROCESS FOR THE PREPARATION OF CROSSLINKED POLYALLYLAMINE POLYMER

(75) Inventors: Kulkarni Mohan Gopalkrishna, Maharashtra (IN); Kanawade Sandeep Thakaji, Maharashtra (IN); Benjamin Swapnanjali Babu, Maharashtra (IN)

(73) Assignee: Council of Scientific of Industrial Research, Pune (IN)

( * ) Notice: Subject to any disclaimer, the term of this patent is extended or adjusted under 35 U.S.C. 154(b) by 306 days.

(21) Appl. No.: 11/365,801

(22) Filed: Mar. 2, 2006

(65) Prior Publication Data

US 2006/0258812 A1   Nov. 16, 2006

(30) Foreign Application Priority Data

Mar. 16, 2005   (IN) .................................. 568/2005

(51) Int. Cl.
    *C08F 8/30*   (2006.01)
(52) U.S. Cl. .................. 525/359.3; 525/328.2
(58) Field of Classification Search ............. 525/328.2, 525/359.3
    See application file for complete search history.

(56) References Cited

U.S. PATENT DOCUMENTS

| | | | | |
|---|---|---|---|---|
| 4,605,701 A * | 8/1986 | Harada et al. ............... 525/107 |
| 4,687,817 A * | 8/1987 | Harada et al. ............... 525/375 |
| 5,496,545 A * | 3/1996 | Holmes-Farley et al. 424/78.11 |
| 5,607,669 A * | 3/1997 | Mandeville et al. ..... 424/78.12 |
| 5,667,775 A * | 9/1997 | Holmes-Farley et al. 424/78.11 |
| 5,679,717 A * | 10/1997 | Mandeville et al. ........ 514/742 |
| 5,703,188 A * | 12/1997 | Mandeville et al. ........ 526/290 |
| 5,840,766 A * | 11/1998 | Mandeville et al. ........ 514/742 |
| 5,917,007 A * | 6/1999 | Mandeville et al. ........ 528/421 |
| 5,919,832 A * | 7/1999 | Mandeville et al. .......... 521/36 |
| 5,925,379 A * | 7/1999 | Mandeville et al. ........ 424/484 |
| 5,969,090 A * | 10/1999 | Mandeville et al. ........ 528/392 |
| 5,981,693 A * | 11/1999 | Mandeville et al. ..... 528/339.3 |
| 6,060,517 A * | 5/2000 | Mandeville et al. ........ 514/742 |
| 6,066,678 A * | 5/2000 | Mandeville et al. ........ 514/742 |
| 6,083,495 A * | 7/2000 | Holmes-Farley et al. .. 424/78.1 |
| 6,083,497 A * | 7/2000 | Huval et al. ............. 424/78.35 |
| 6,180,754 B1 * | 1/2001 | Stutts et al. ................. 528/422 |
| 6,190,649 B1 * | 2/2001 | Holmes-Farley et al. 424/78.08 |
| 6,203,785 B1 * | 3/2001 | Holmes-Farley et al. 424/78.18 |
| 6,294,163 B1 * | 9/2001 | Dhal et al. ................ 424/78.01 |
| 6,303,723 B1 * | 10/2001 | Sen et al. .................... 526/211 |
| 6,362,266 B1 * | 3/2002 | Buchholz et al. ........... 524/318 |
| 6,423,754 B1 * | 7/2002 | Holmes-Farley et al. 424/78.18 |
| 6,433,026 B2 * | 8/2002 | Mandeville et al. ........ 514/742 |
| 6,509,013 B1 * | 1/2003 | Holmes-Farley et al. .. 424/78.1 |
| 6,579,933 B1 * | 6/2003 | Hayashi et al. ............. 524/814 |
| 6,600,011 B2 * | 7/2003 | McDonnell et al. ........ 528/480 |
| 6,667,775 B2 * | 12/2003 | Matsushita et al. ......... 348/655 |
| 6,696,087 B2 * | 2/2004 | Matsuda et al. ............ 424/464 |
| 6,733,780 B1 * | 5/2004 | Tyler et al. ................. 424/464 |
| 6,787,587 B1 * | 9/2004 | Kato et al. .................. 523/300 |
| 2004/0028803 A1 * | 2/2004 | Stanek et al. ................ 427/2.1 |
| 2004/0039086 A1 * | 2/2004 | Stanek et al. ............... 523/344 |
| 2004/0191212 A1 * | 9/2004 | Holmes-Farley et al. 424/78.27 |

* cited by examiner

*Primary Examiner*—Bernard Lipman
(74) *Attorney, Agent, or Firm*—Pharmaceutical Patent Attorneys, LLC

(57) ABSTRACT

The present invention provides a process for crosslinking of polyallylamine hydrochloride wherein an aqueous solution of polyallylamine hydrochloride is partly neutralized with alkali and epichlorohydrin is added. The aqueous solution is dispersed in an organic medium containing a surfactant. This leads to gelation in individual droplets. The crosslinking in individual gel beads is completed by raising the temperature. The resulting beads are then separated, washed with water, treated with an organic solvent and dried. The method maximizes the yield of crosslinked polyallylamine hydrochloride particles in the range 60-100 mesh.

15 Claims, No Drawings

PROCESS FOR THE PREPARATION OF CROSSLINKED POLYALLYLAMINE POLYMER

CROSS REFERENCE TO RELATED APPLICATION

This application claims priority to Indian Patent Application No. 0568/DEL/2005 filed Mar. 16, 2005, the entirety of which is hereby incorporated by reference.

BACKGROUND OF THE INVENTION

1. Field of Invention

The present invention relates to an improved process for the preparation of crosslinked polyallylamine. More specifically the present invention relates to a process for crosslinking of aqueous polyallylamine dispersed in an organic medium so as to maximize the yield of crosslinked product in the desired particle size range of 60 to 100 mesh.

2. Background of the Technology

Polyallylamine is a polymer of allylamine. The amine group of the polymer can be functionalized further. The polymer finds a wide range of applications such as flocculants, coatings and additives. It is well known that the monomer mono allyl amine does not polymerize readily as it undergoes degradative chain transfer. Allylamine is therefore converted into its salt such as hydrochloride or sulfate and polymerized in the presence of a free radical initiator. The polymerization of salts of allylamine is described adequately in U.S. Pat. Nos. 6,303,723, 6,787,587, 6,579, 933, 6,509,013, 6,083,495, 5,667,775, 5,496,545, which are cited herein by way of reference.

Polyallylamine hydrochloride solutions are then partly neutralized and crosslinked using a wide range of crosslinking agents described in U.S. Pat. Nos. 6,509,013, 6,083,495, 5,667,775, 5,496,545, 4,605,701, which are cited herein by way of reference. The crosslinkers typically used are epichlorohydrin, 1,4 butane diol diglycidyl ether, 1,2 ethane diol diglycidyl ether, 1,3 dichloropropane, 1,2 dichloroethane, succinyl dichloride, dimethyl succinate and toluene diisocyanate. More specifically the partly neutralized polymer of allylamine hydrochloride is crosslinked using epichlorohydrin.

The use of crosslinked polymer for binding phosphates and bile acids is disclosed in U.S. Pat. Nos. 5,496,545, 6,667,775, 6,083,495, 6,509,013, 6,696,087, 6,433,026, 6,423,754, 6,294,163, 6,203,785, 6,190,649, 6,083,497, 6,066,678, 6,060,517, 5,981,693, 5,925,379, 5,919,832, 5,969,090, 5,917,007, 5,840,766, 5,703,188, 5,679,717, 5,607,669.

The crosslinked polymers are formulated in tablets as described in U.S. Pat. Nos. 6,696,087 and 6,733,780. The methods of making phosphate binding polymers for oral administration are described in U.S. Pat. Nos. 6,509,013, 6,083,495, 5,496,545, 5,667,775, more particularly the U.S. Pat. Nos. 5,496,545, 5,667,775, 6,083,495, 6,509,013, 4,605,701, which are cited herein by way of reference.

According to the teaching of the U.S. Pat. No. 6,083,495, the method of crosslinking involves reacting for about 15 minutes polyallylamine with a difunctional crosslinking agent in an aqueous solution as to form a gel and allowing the gel to cure for 18 hours at room temperature. The gel is then fragmented into gel particles in a blender in the presence of isopropanol. The gel particles are then washed repeatedly with water and then suspended in isopropanol, filtered and dried in vacuum oven for 18 hours.

The process of crosslinking in aqueous solution described in above patents, leads to gelation. Curing at room temperature takes a long time. The gel is difficult to break into gel particles and needs application of high shear in special equipments. The gel particles swell when repeatedly extracted with water and need to be treated with isopropanol again prior to drying. The process also consumes large excess of water and isopropanol. The gel particles need to be dried in a vacuum oven for long time.

This is because polymeric gels adhere to each other and equipment surfaces. In order to overcome problems associated, drying is carried out in presence of additives, which are either azeotrope forming solvents or agents which influence surface wetting of the gel particles. The U.S. Pat. No. 6,600,011 describes the spray drying technique for drying of crosslinked polyallylamine, which is claimed to avoid damage to shear sensitive polymer gels, and also enables improved particle size control. The patent also describes the use of a Ystral three stage disperser to achieve the desired particle size.

Drying of the aqueous slurry by spray drying, needs careful control of the feed pressure and temperature. Especially the feed temperature depends on the nature of the feed in that the feed temperature has to be below the glass transition temperature of the hydrogel and needs to be so adjusted as not to degrade the hydrogel. The U.S. Pat. Nos. 6,362,266 and 6,180,754 describe a process for producing a crosslinked polyallylamine polymer having reduced cohesiveness. According to the teachings of the said patents the crosslinking reaction is carried out in a specially designed reactor, which can handle highly viscous solutions and can break the gel into small pieces after gelation. Typically a LIST-Discotherm B reactor is suitable for carrying out the crosslinking reaction which generates easy to handle clumps of gel. The application of high shear is detrimental as it leads to the formation of soluble oligomers.

The dried crosslinked polymer is further ground using a mortar and pestle, a Retsch mill or a Fritz mill. The patents further describe that during the drying stage the hydrogel becomes highly cohesive, which leads to high power consumption to rotate the agitator. The addition of a surfactant is recommended to reduce the cohesiveness during drying. In summary, the crosslinking of polyallylamine in aqueous solution leads to gelation. The gel is then fragmented in blenders into gel particles, which are then treated with water and isopropanol and then dried. It is also reported that the application of high shear contributes to soluble oligomers, which are undesirable. Hence methods have been proposed to minimize the oligomer content in the final product. Also the use of specific equipments like LIST Discotherm B reactor has been suggested for carrying out crosslinking and spray driers for drying the crosslinked polymers. Especially spray drying is a critical operation in that the feed temperature has to be below the glass transition temperature of the crosslinked polymer.

The existing methods of crosslinking polyallylamine polymer need specialized equipments for converting the gel into gel particles and /or drying the gel particles formed.

The polyallylamine hydrochloride salt used for crosslinking in the present invention is reported extensively in the literature. More specifically the synthesis of the polyallylamine hydrochloride polymer is disclosed in the U.S. Pat. Nos. 6,083,495, 5,667,775, 5,496,545, 6,303,723, 4,605, 701, 6,509,013, the disclosures of which are incorporated herein by reference.

The polyallylamine hydrochloride polymer used for crosslinking is partly neutralized prior to crosslinking. This is achieved by dissolving the polymer in water and by adding a calculated amount of alkali such as sodium hydroxide or potassium hydroxide either as a solid or as an aqueous solution.

U.S. Pat. No. 6,362,266 reports ion exchange, dialysis nano filtration or ultrafiltration as methods to remove the salt. In the crosslinking processes described in U.S. Pat. Nos. 6,509,013, 5,496,545, 5,667,775, 6,083,495 the salts are removed by extraction with water after the crosslinked polyallylamine polymer obtained in the form of gel is fragmented into gel particles by treatment with isopropanol in a blender. This process involves the treatment of gel mass in blenders in presence of solvents and is not easy to operate.

The process described by the present invention leads to the formation of gel particles, which can be more readily washed either with an organic solvent or water in order to extract the salts. Furthermore, the gel particles formed as a result of the process described herein, do not readily agglomerate and hence can be washed with water and solvent readily and can also be dried more easily.

The crosslinking agents used for the crosslinking of the polyallylamine hydrochloride are extensively described in the U.S. Pat. Nos. 6,362,266, 6,509,013, 5,496,545, 5,667,775, 6,083,495. In the above patents, the crosslinking agent is added to the partly neutralized polyallylamine hydrochloride at room temperature and the crosslinking reaction is allowed to proceed as such. In contrast, according to the procedure described in this invention, it is desirable to cool the neutralized polyallylamine hydrochloride solution in the range 4° C.-10° C. prior to the addition of the crosslinking agent so that the polymer solution does not undergo substantial crosslinking before the dispersion of the aqueous solution into the organic medium is complete and the dispersion of the aqueous phase in the organic phase is readily achieved. The dispersion of the aqueous phase comprising partly neutralized polyallylamine hydrochloride salt and crosslinking agent, in an organic medium is more readily achieved by incorporating a suitable surfactant such as SPAN 85 in the organic medium.

According to the teaching of the U.S. Pat. Nos. 5,667,775, 5,496,545, 6,083,495, 6,509,013, the aqueous polyallylamine solutions to which the crosslinking agent is added, gel in about 15 minutes and the gel is then allowed to cure for 18 hrs at room temperature. The gel is then broken into pieces by putting into a blender with isopropanol. While this treatment can be carried out on the scales described in these patents, these operations are more difficult to carry out on large scales. U.S. Pat. No. 6,362,266 describes the use of LIST-Discotherm B reactor to process high viscosity materials and break the gel into small gel particles.

According to the method of the present invention, the polymer solution containing the crosslinking agent is dispersed in an organic medium before substantial crosslinking takes place. Since the polymer solution is crosslinked in individual liquid droplets to form gel particles, which are suspended in an organic phase, the viscosity of the resulting dispersion is much lower than the viscosity of gel formed when crosslinking is carried out according to the methods previously reported in the literature. The crosslinking of polyallylamine hydrochloride as described herein can be readily carried out in conventional batch reactors provided with stirrers commonly used in the chemical industry.

U.S. Pat. No. 4,605,701 describes the use of chlorobenzene and dichlorobenzene as an organic solvent and a non ionic surfactant sorbitane sesquioleate. However, the use of chlorinated hydrocarbons is being discouraged in view of the environmental damage caused by the chlorinated hydrocarbons. Also high boiling points of solvents such as chlorobenzene and dichlorobenzene render the removal of solvents from the polymer difficult. Accordingly the present invention envisages the use of non chlorinated solvents as organic medium.

Further, the above patent claims the crosslinked homopolymer of monoallylamine having a particle size not more than 2 mm. However, the said patent does not deal any further with the particle size and its distribution and more particularly the importance of the particle size in relation to the properties and applications of the polymer in phosphate binding.

In a surprising development the inventors of the present invention have observed that the phosphate binding capacity of the crosslinked polyallylamine hydrochloride, which is indicative of the ability of the crosslinked polymer to bind with the phosphates in the body, also depends upon the particle size of the dried product. The crosslinking of the polyallylamine hydrochloride in the dispersion medium results in a distribution of the particle sizes. The coarse particles exhibit a lower phosphate binding capacity. The finer particles exhibit a higher phosphate binding capacity. While the coarse particle generated during the process can be further ground to yield product in the desired size range in 60-100 mesh, the grinding process also produces fines, which pass through a 100 mesh sieve. While the phosphate binding capacity of the fines is not significantly different than the particles in the size range 60-100 mesh, the fines are not particularly suitable for the preparation of tablets. It is therefore desirable that the crosslinking of polyallylamine hydrochloride be carried out under conditions wherein the particle size of the crosslinked product produced in the reactor is in the range 60-100 mesh, so that no further processing is required.

There is therefore a need to develop a method for the synthesis of crosslinked polyallylamine which will simplify the manufacturing method, minimize the need for specialized equipments, bring down the need for wash solvents and will thus bring down the manufacturing costs.

According to the method of the present invention, the crosslinking is carried out in the dispersion medium in the presence of a suitable surfactant and the choice of the stirrer and stirring speed such that the yield of the crosslinked product in the size range 60-100 mesh is maximized. If the yield of the product which passes through the 100 mesh sieve and which is retained over 60 mesh sieve is minimized, only a small portion of the product of the reactor will have to be subjected to size reduction and the loss of fines will also be minimum.

Objectives of the Invention

The main object of this invention is a simplified process for the synthesis of crosslinked polyallylamine hydrochloride.

Another object of this invention is to provide a process which could maximize the yield of the crosslinked polyallylamine hydrochloride having particle size distribution in the range 60-100 mesh.

Yet another object of this invention is to provide a process which avoids the need of specialized equipments for the manufacture of the said product and thus reduces the manufacturing cost.

SUMMARY OF THE INVENTION

The present invention provides a process for producing a crosslinked polyallylamine polymer directly in the form of the gel particles. The process comprises mixing a crosslinking agent with a chilled aqueous solution of partly neutralized polyallylamine hydrochloride, dispersing the aqueous solution in an organic solvent containing surfactant, maintaining the dispersion at room temperature, while stirring continuously, raising the temperature and maintaining the dispersion at this temperature so as to complete the crosslinking reaction, separating the gel particles from the organic medium, washing with water and finally with a solvent and drying the crosslinked polyallylamine. The method maximizes the yield of crosslinked polyallylamine hydrochloride particles in the size range 60-100 mesh.

DETAILED DESCRIPTION OF THE INVENTION

Accordingly the present invention provides an improved process for the preparation of crosslinked polyallylamine polymer having particle size in the range 60 to 100 meshs which comprises partly neutralizing polyallylamine hydrochloride in the range of 58 to 90% with an alkali in an aqueous solution, chilling the above said solution to a temperature in the range of 4 to 10° C., adding a crosslinking agent to the above said chilled solution and dispersing the resultant mixture in an organic solvent containing a surfactant, under agitation, at a speed of 800 to 1200 rpm, allowing the reaction to occur initially at a temperature in the range of 25-30° C., for a period of about 10 minutes and further increasing the reaction temperature to a maximum of about 80° C. and allowing the reaction to continue for at least three hours, cooling the above said reaction mixture to a temperature in the range of 25-30° C., filtering the above said reaction mixture to separate the gel particles, washing the above said gel particles with water and finally with a water miscible organic solvent and removing the excess solvent followed by drying under vacuum to obtain the desired crosslinked polyallylamine polymer.

In an embodiment of the present invention the alkali used is an alkali hydroxide. In another embodiment of the present invention the alkali hydroxide used is sodium hydroxide.

In another embodiment the surfactant used is commercially available SPAN-85. In yet another embodiment the concentration of the surfactant used is ranging between 0.25 to 1% (v/v) of the organic solvent.

In yet another embodiment the ratio of the aqueous phase to organic phase used is in the range 1:3.3 to 1:8.

In yet another embodiment the organic solvent used for dispersion is selected from aromatic and aliphatic hydrocarbon.

In yet another embodiment the organic solvent used for dispersion is aromatic hydrocarbon selected from the group consisting of toluene, xylene and ethyl benzene.

In yet another embodiment the organic solvent used for dispersion is aliphatic hydrocarbon selected from the group consisting of hexane, heptane, octane decane, dodecane and paraffin.

In yet another embodiment the organic solvent used for washing the crosslinked polyallylamine polymer is selected from alcohol, ketone and ester In yet another embodiment the organic solvent used is an alcohol selected from the group consisting of methanol, ethanol and isopropanol.

In yet another embodiment the organic solvent used is a ketone selected from the group consisting of acetone, methyl ethylketone, methyl isobutyl ketone. In yet another embodiment the organic solvent used is an ester selected from methyl acetate and ethyl acetate.

In yet another embodiment 70 to 90% of the crosslinked polyallylamine obtained has particle size distribution in the range of 60-100 mesh.

In still another embodiment the phosphate binding capacity of the crosslinked polyallylamine obtained is in the range 2.9-3.25 meq phosphate/g.

The novelty of the present invention lies in the preparation of controlled particle size crosslinked polyallylamine polymer having particle size distribution in the range of 60-100 mesh in high yield.

The invention is now described in details by reference to the following examples, which are purely illustrative in nature and shall in no way limit the scope of the invention.

EXAMPLE 1

15 g of polyallylamine hydrochloride of intrinsic viscosity 0.18 dl/g in 0.1 N NaCl solution was partly neutralized with aqueous solution of sodium hydroxide as shown in table 1 to convert part of amine hydrochloride to free amine. The resulting mixture was cooled to 5° C. To a jacketed kettle equipped with mechanical stirrer and condenser was added toluene (120 ml) and sorbitane trioleate (0.6 ml) (Span 85). Epichlorohydrin (1.8 ml) was added all at once to the partly neutralized polyallylamine hydrochloride solution. This solution was immediately dispersed in toluene with stirring. The mixture was heated to 60° C. and stirred for 3 hrs. Toluene was decanted. The crosslinked polyallylamine hydrochloride formed was washed 3 times by suspending in 150 ml of de-ionized water stirring magnetically for 45 min. followed by filtration. The crosslinked solid was rinsed once by suspending it in isopropanol (200 ml) stirring for 45 min followed by filtration. The solid was dried under vacuum for 8 hrs.

Table-1 illustrates the degree of neutralization and corresponding phosphate binding capacities of crosslinked polyallylamine hydrochloride polymers as a function of degree of neutralization.

TABLE 1

| Sr. No. | Sodium Hydroxide (g) | Degree of neutralization (%) | Phosphate binding capacity meq/g |
| --- | --- | --- | --- |
| A | 3.8 | 59.2 | 3.87 |
| B | 4.2 | 65.4 | 3.17 |
| C | 4.8 | 74.8 | 2.42 |
| D | 5.3 | 82.5 | 1.55 |
| E | 5.7 | 88.8 | 0.89 |

EXAMPLE 2

15 g of polyallylamine hydrochloride was neutralized with aqueous solution of sodium hydroxide (4.2 g) to convert part of amine hydrochloride to free amine. The resulting mixture was cooled to 5° C. To a jacketed kettle equipped with mechanical stirrer and condenser was added toluene (120 ml) and sorbitane trioleate (0.6 ml) (Span 85). Epichlorohydrin (1.8 ml), was added all at once to the partly neutralized polyallylamine hydrochloride solution. This solution was immediately dispersed in toluene with stirring. The mixture was heated to 60° C.) and stirred for 3 hr. Toluene was decanted. The crosslinked polyallylamine hydrochloride formed was washed 3 times by suspending in 150 ml of de-ionized water stirring magnetically for 45 min. followed by filtration. The crosslinked solid was rinsed once by suspending it in isopropanol (200 ml) stirring for 45 min followed by filtration. The solid was dried under vacuum for 8 hrs.

Table 2 illustrates crosslinking of polyallylamine hydrochloride polymer differing in intrinsic viscosity.

TABLE 2

| Sr. No. | Intrinsic viscosity dl/g | Phosphate binding capacity meq/g |
|---|---|---|
| A | 0.18 | 3.17 |
| B | 0.20 | 3.12 |
| C | 0.22 | 3.12 |
| D | 0.24 | 2.98 |

EXAMPLE 3

15 g of polyallylamine hydrochloride was neutralized with aqueous solution of sodium hydroxide (4.2 g) to convert part of amine hydrochloride to free amine. The resulting mixture was cooled to 7° C. To a jacketed kettle equipped with mechanical stirrer and condenser was added toluene (120 ml) and sorbitane trioleate (0.6 ml) (SPAN 85). Epichlorohydrin, crosslinking agent was added all at once to the partly neutralized polyallylamine hydrochloride solution. This solution was immediately dispersed in toluene with stirring. The mixture was heated to 60° C. and stirred for 3 hrs. Toluene was decanted. The crosslinked polyallylamine hydrochloride formed was washed 3 times by suspending in 150 ml of de-ionized water stirring magnetically for 45 min. followed by filtration. The crosslinked solid was rinsed by suspending it in isopropanol (200 ml) stirring for 45 min followed by filtration. The solid was dried under vacuum for 8 hrs.

Table 3 describes crosslinking of polyallylamine hydrochloride using different quantities of epichlorohydrin.

TABLE 3

| Sr. No. | Epichlorohydrin ml | Phosphate binding capacity meq/g |
|---|---|---|
| A | 0.8 | 2.47 |
| B | 1.2 | 2.91 |
| C | 1.8 | 3.17 |
| D | 2.4 | 5.03 |

EXAMPLE 4

15 g of polyallylamine hydrochloride was neutralized with aqueous solution of sodium hydroxide (4.2 g ) to convert part of amine hydrochloride to free amine. The resulting mixture was cooled to 5° C. To a jacketed kettle equipped with mechanical stirrer and condenser was added toluene (120 ml) and sorbitane trioleate (0.6 ml) (SPAN 85). Epichlorohydrin (1.8 ml), was added all at once to the partly neutralized polyallylamine hydrochloride solution. This solution was immediately dispersed in organic solvent with stirring. The mixture was heated to 60° C. and stirred for 3 hrs. The organic solvent was decanted. The crosslinked polyallylamine hydrochloride formed was washed 3 times by suspension in 150 ml of deionized water stirring magnetically for 45 min. followed by filtration. The crosslinked solid was rinsed by suspending it in isopropanol (200 ml) stirring for 45 min followed by filtration. The solid was dried under vacuum for 8 hrs.

Table 4 describes crosslinking of polyallylamine hydrochloride carried out in different dispersion media.

In example D paraffin oil was decanted. Trace amount of paraffin oil was removed washing it with hexane. The crosslinked polyallylamine hydrochloride was washed 3 times by suspending in 150 ml of de-ionized water stirring magnetically for 45 min. followed by filtration. The crosslinked solid was rinsed by suspending it in isopropanol (200 ml) stirring for 45 min followed by filtration. The solid was dried under vacuum for 8 hrs.

TABLE 4

| Sr.No. | Dispersion medium | Phosphate binding capacity meq/g |
|---|---|---|
| A | Toluene | 3.17 |
| B | Hexane | 3.16 |
| C | Xylene | 3.22 |
| D | Paraffin oil | 3.18 |

EXAMPLE 5

15 g of polyallylamine hydrochloride was neutralized with aqueous solution of sodium hydroxide (4.2 g) to convert part of amine hydrochloride to free amine. The resulting mixture was cooled to 5° C. To a jacketed kettle equipped with mechanical stirrer and condenser was added toluene (120 ml) and sorbitane trioleate (SPAN 85). Epichlorohydrin (1.8 ml), was added all at once to the partly neutralized polyallylamine hydrochloride solution. This solution was immediately dispersed in toluene with stirring. The mixture was heated to 60° C. and stirred for 3 hrs. Toluene was decanted. The crosslinked polyallylamine hydrochloride was washed 3 times by suspending in 150 ml of de-ionized water stirring magnetically for 45 min. followed by filtration. The crosslinked solid was rinsed by suspending it in isopropanol (200 ml) stirring for 45 min followed by filtration. The solid was dried under vacuum for 8 hrs.

Table 5 describes crosslinking of polyallylamine hydrochloride using different amounts of surfactant (SPAN -85).

The particle size distribution of the product obtained and the phosphate binding capacities are summarized below:

TABLE 5

| Sr No. | SPAN-85 Conc. (%) | % Above 60 mesh (meq PO$_4$/g) | % 60-100 mesh (meq PO$_4$/g) | % Below100 mesh (meq PO$_4$/g) |
|---|---|---|---|---|
| A | 1 | 15.14 (2.23) | 72.58 (2.96) | 12.28 (3.22) |
| B | 0.5 | 32.38 (2.38)) | 60.00 (3.0) | 7.62 (3.31) |
| C | 0.25 | 34.22 (2.57) | 59.02 (3.18) | 6.76 (3.26) |
| D | No surfactant | 94.94 (2.76) | 4.67 (3.17) | 0.39 (3.31) |

The above data indicate the need to control the particle size distribution so as to maximize the yield of the product in the size range 60-100 mesh and minimize the yield of the product in the size range which passes through 100 mesh sieve.

EXAMPLE 6

15 g of polyallylamine hydrochloride was neutralized with aqueous solution of sodium hydroxide (4.2 g) to convert part of amine hydrochloride to free amine. The resulting mixture was cooled to 5° C. To a jacketed kettle equipped with mechanical stirrer and condenser was added toluene (120 ml) and 0.6 ml sorbitane trioleate (SPAN 85). Epichlorohydrin (1.8 ml), was added all at once to the partly neutralized polyallylamine hydrochloride solution. This solution was immediately dispersed in toluene with stirring using a stirrer, which has four blades at the bottom, two blades at the center and two blades above the blades at the center. The mixture was heated to 60° C. and stirred at a predetermined speed for 3 hrs. Toluene was decanted. The crosslinked polyallylamine hydrochloride formed was washed 3 times by suspending in 150 ml of de-ionized water stirring magnetically for 45 min. followed by filtration. The crosslinked solid was rinsed by suspending it in isopropanol (200 ml) stirring for 45 min followed by filtration. The solid was dried under vacuum for 8 hrs. The particle size distribution of the product obtained and the phosphate binding capacities are summarized below.

Table 6 describes the crosslinking of polyallylamine hydrochloride under different stirring conditions.

TABLE 6

| Sr. No. | RPM | % Above 60 mesh (meq PO$_4$/g) | % 60-100 mesh (meq PO$_4$/g) | % Below 100 mesh (meq PO$_4$/g) |
| --- | --- | --- | --- | --- |
| A | 800 | 58.36 (2.73) | 39.19 (3.0) | 2.45 (3.29) |
| B | 1000 | 32.38 (2.38) | 60.00 (3.0) | 7.81 (3.31) |
| C | 1200 | 19.2 (2.69) | 70.6 (3.12) | 10.20 (3.40) |

The above data indicates that an optimal stirring speed results in maximizing the yield of crosslinked polyallylamine hydrochloride in the particle size range 60-100 mesh and minimizing the yield of fines which pass through 100 mesh sieve.

The advantages of the present invention are:
1) The present invention is a simplified crosslinking process.
2) The present invention provides a maximum yield of particles of crosslinked polyallylamine in the size ranging from 60-100 mesh.
3) The present process eliminates the need of specialized and expensive equipments for manufacturing and can be completed in shorter reaction time.

We claim:

1. An improved process for the preparation of crosslinked polyallylamine polymer having particle size of 60 to 100 mesh which comprises partly neutralizing polyallylamine hydrochloride in the range of 58 to 90% with an alkali in an aqueous solution, chilling the above said solution to a temperature in the range of 4 to 10° C., adding a crosslinking agent to the above said chilled solution and dispersing the resultant mixture in an organic solvent containing a surfactant, under agitation, at a speed of 800 to 1200 rpm, allowing the reaction to occur initially at a temperature in the range of 25-30° C., for a period of about 10 minutes and further increasing the reaction temperature to a maximum of about 80° C. and allowing the reaction to continue for at least three hours, cooling the above said reaction mixture to a temperature in the range of 25-30° C., filtering the above said reaction mixture to separate the gel particles, washing the above said gel particles with water and finally with a water miscible organic solvent and removing the excess solvent followed by drying under vacuum to obtain the desired crosslinked polyallylamine polymer.

2. An improved process as claimed in claim 1, wherein the alkali used is an alkali hydroxide.

3. An improved process as claimed in claim 1, wherein the alkali hydroxide used is Sodium hydroxide.

4. An improved process as claimed in claim 1, wherein the surfactant used is commercially available SPAN-85.

5. An improved process as claimed in claim 1, wherein the concentration of the surfactant used is ranging between 0.25 to 1% (v/v) of the organic solvent.

6. An improved process as claimed in claim 1, wherein the ratio of the aqueous phase to organic phase used is in the range 1:3.3 to 1:8.

7. An improved process as claimed in claim 1, wherein the organic solvent used for dispersion is selected from aromatic and aliphatic hydrocarbon.

8. An improved process as claimed in claim 1, wherein the organic solvent used for dispersion is aromatic hydrocarbon selected from the group consisting of toluene, xylene and ethyl benzene.

9. An improved process as claimed in claim 1, wherein the organic solvent used for dispersion is aliphatic hydrocarbon selected from the group consisting of hexane, heptane, octane decane, dodecane and paraffin.

10. An improved process as claimed in claim 1, wherein the organic solvent used for washing the crosslinked polyallylamine polymer is selected from alcohol, ketone and ester.

11. An improved process as claimed in claim 1, wherein the organic solvent used is alcohol selected from the group consisting of methanol, ethanol and isopropanol.

12. An improved process as claimed in claim 1, wherein the organic solvent used is ketone selected from the group consisting of acetone, methyl ethylketone, methyl isobutyl ketone.

13. An improved process as claimed in claim 1, wherein the organic solvent used is ester selected from methyl acetate and ethyl acetate.

14. An improved process as claimed in claim 1, wherein 70 to 90% of the crosslinked polyallylamine obtained has particle size distribution in the range of 60-100 mesh.

15. A process as claimed in claim 1, wherein the phosphate binding capacity of the crosslinked polyallylamine obtained is in the range 2.9-3.25 meq phosphate/g.

* * * * *